(12) United States Patent
Harang

(10) Patent No.: US 11,947,668 B2
(45) Date of Patent: Apr. 2, 2024

(54) METHODS AND APPARATUS FOR PRESERVING INFORMATION BETWEEN LAYERS WITHIN A NEURAL NETWORK

(71) Applicant: Sophos Limited, Abingdon (GB)

(72) Inventor: Richard Harang, Alexandria, VA (US)

(73) Assignee: Sophos Limited, Abingdon (GB)

( * ) Notice: Subject to any disclaimer, the term of this patent is extended or adjusted under 35 U.S.C. 154(b) by 1204 days.

(21) Appl. No.: 16/158,844

(22) Filed: Oct. 12, 2018

(65) Prior Publication Data

US 2020/0117975 A1    Apr. 16, 2020

(51) Int. Cl.
G06N 3/04        (2023.01)
G06F 18/21       (2023.01)
(Continued)

(52) U.S. Cl.
CPC .............. *G06F 21/56* (2013.01); *G06F 18/21* (2023.01); *G06F 18/24* (2023.01); *G06N 3/04* (2013.01);
(Continued)

(58) Field of Classification Search
CPC .. G06N 3/04; G06N 3/02; G06N 5/02; G06N 7/02; G06N 3/0454; G06F 21/56;
(Continued)

(56) References Cited

U.S. PATENT DOCUMENTS 7,069,589 B2    6/2006  Schmall et al.
7,204,152 B2    4/2007  Woodward et al.
(Continued)

FOREIGN PATENT DOCUMENTS

CA    2799691 C       9/2014
JP    2012027710 A    2/2012
(Continued)

OTHER PUBLICATIONS

Xu K, Li Y, Deng RH, Chen K. Deeprefiner: Multi-layer android malware detection system applying deep neural networks. In2018 IEEE European Symposium on Security and Privacy (EuroS&P) Apr. 24, 2018 (pp. 473-487). IEEE. (Year: 2018).*

(Continued)

*Primary Examiner* — Edward F Urban
*Assistant Examiner* — Duy Tran
(74) *Attorney, Agent, or Firm* — COOLEY LLP

(57) ABSTRACT

In some embodiments, an apparatus includes a memory and a processor. The processor is configured to extract a set of features from a potentially malicious file and provide the set of features as an input to a normalization layer of a neural network. The processor is configured to implement the normalization layer by calculating a set of parameters associated with the set of features and normalizing the set of features based on the set of parameters to define a set of normalized features. The processor is further configured to provide the set of normalized features and the set of parameters as inputs to an activation layer of the neural network such that the activation layer produces an output based on the set of normalized features and the set of parameters. The output can be used to produce a maliciousness classification of the potentially malicious file.

20 Claims, 5 Drawing Sheets

(51) Int. Cl.
  *G06F 18/24*    (2023.01)
  *G06F 21/56*    (2013.01)
  *G06K 9/62*     (2022.01)
  *G06V 10/72*    (2022.01)
  *G06V 10/764*   (2022.01)
  *G06V 10/82*    (2022.01)

(52) U.S. Cl.
  CPC ............ *G06V 10/72* (2022.01); *G06V 10/764* (2022.01); *G06V 10/82* (2022.01)

(58) Field of Classification Search
  CPC ...... G06F 21/125; G06F 21/128; G06F 21/52; G06K 9/6217; G06K 9/6267; G06V 10/70; G06V 10/766; G06V 30/191; G06V 10/764; G06V 30/19173
  See application file for complete search history.

(56) References Cited

U.S. PATENT DOCUMENTS

| | | |
|---|---|---|
| 7,219,148 B2 | 5/2007 | Rounthwaite et al. |
| 7,545,986 B2 | 6/2009 | Bachmann |
| 7,558,832 B2 | 7/2009 | Rounthwaite et al. |
| 7,711,663 B2 | 5/2010 | Weng |
| 7,769,772 B2 | 8/2010 | Weyl et al. |
| 7,934,103 B2 | 4/2011 | Kidron |
| 8,458,794 B1 | 6/2013 | Sallam |
| 8,635,700 B2 | 1/2014 | Richard et al. |
| 8,709,924 B2 | 4/2014 | Hanawa et al. |
| 9,189,730 B1 | 11/2015 | Coenen et al. |
| 9,404,833 B2 | 8/2016 | Stadlbauer et al. |
| 9,465,940 B1 | 10/2016 | Wojnowicz et al. |
| 9,514,391 B2 | 12/2016 | Perronnin et al. |
| 9,531,742 B2 | 12/2016 | Kohout et al. |
| 9,672,358 B1 | 6/2017 | Long et al. |
| 9,680,868 B2 | 6/2017 | Bailey et al. |
| 9,690,938 B1 | 6/2017 | Saxe et al. |
| 9,721,097 B1 | 8/2017 | Davis et al. |
| 9,792,492 B2 | 10/2017 | Soldevila et al. |
| 9,807,113 B2 | 10/2017 | Yang et al. |
| 9,864,956 B1 | 1/2018 | Sai |
| 10,015,150 B2 | 7/2018 | Basin |
| 10,193,902 B1 | 1/2019 | Caspi |
| 10,521,587 B1 | 12/2019 | Agranonik et al. |
| 10,599,844 B2 | 3/2020 | Schmidtler et al. |
| 10,635,813 B2 | 4/2020 | Saxe et al. |
| 10,742,591 B2 | 8/2020 | Nguyen et al. |
| 10,834,128 B1 | 11/2020 | Rajagopalan et al. |
| 10,956,477 B1 | 3/2021 | Fang et al. |
| 11,003,774 B2 | 5/2021 | Saxe et al. |
| 11,270,205 B2 | 3/2022 | Harang |
| 11,321,607 B2 | 5/2022 | Shah et al. |
| 11,409,869 B2 | 8/2022 | Schmidtler et al. |
| 11,574,052 B2 | 2/2023 | Harang |
| 11,609,991 B2 | 3/2023 | Saxe et al. |
| 2006/0013475 A1* | 1/2006 | Philomin ............ G06F 18/2414 382/156 |
| 2009/0122718 A1 | 5/2009 | Klessig et al. |
| 2009/0254992 A1 | 10/2009 | Schultz et al. |
| 2009/0300765 A1 | 12/2009 | Moskovitch et al. |
| 2013/0067579 A1 | 3/2013 | Beveridge et al. |
| 2014/0090061 A1 | 3/2014 | Avasarala et al. |
| 2014/0143869 A1 | 5/2014 | Pereira et al. |
| 2015/0046850 A1 | 2/2015 | Kurabayashi et al. |
| 2015/0067853 A1 | 3/2015 | Amrutkar et al. |
| 2015/0213376 A1 | 7/2015 | Ideses et al. |
| 2015/0363294 A1 | 12/2015 | Carback, III et al. |
| 2016/0065597 A1 | 3/2016 | Nguyen et al. |
| 2016/0217368 A1* | 7/2016 | Ioffe ....................... G06V 10/70 |
| 2016/0218933 A1 | 7/2016 | Porras et al. |
| 2016/0253500 A1 | 9/2016 | Alme et al. |
| 2017/0046616 A1* | 2/2017 | Socher ................... G06N 3/084 |
| 2017/0078317 A1 | 3/2017 | Gertner et al. |
| 2017/0109615 A1* | 4/2017 | Yatziv ............... G06F 18/24323 |
| 2017/0212829 A1 | 7/2017 | Bales et al. |
| 2017/0351948 A1* | 12/2017 | Lee ........................... G06N 3/04 |
| 2017/0372071 A1* | 12/2017 | Saxe ....................... G06N 3/084 |
| 2018/0060580 A1* | 3/2018 | Zhao ...................... G06N 20/20 |
| 2018/0101682 A1 | 4/2018 | Krukov et al. |
| 2018/0121802 A1* | 5/2018 | Ruckauer ............... G06N 3/049 |
| 2018/0129786 A1 | 5/2018 | Khine |
| 2018/0137642 A1 | 5/2018 | Malisiewicz et al. |
| 2018/0144242 A1 | 5/2018 | Simard |
| 2018/0152471 A1 | 5/2018 | Jakobsson |
| 2018/0211041 A1 | 7/2018 | Davis |
| 2018/0285740 A1* | 10/2018 | Smyth .................... G06N 3/084 |
| 2018/0285773 A1 | 10/2018 | Hsiao et al. |
| 2018/0288086 A1 | 10/2018 | Amiri et al. |
| 2018/0293381 A1 | 10/2018 | Tseng et al. |
| 2019/0065744 A1 | 2/2019 | Gaustad |
| 2019/0095805 A1 | 3/2019 | Tristan |
| 2019/0108338 A1 | 4/2019 | Saxe et al. |
| 2019/0132355 A1 | 5/2019 | Egbert et al. |
| 2019/0205402 A1 | 7/2019 | Sernau et al. |
| 2019/0236273 A1 | 8/2019 | Saxe et al. |
| 2019/0236490 A1 | 8/2019 | Harang et al. |
| 2019/0258807 A1 | 8/2019 | DiMaggio et al. |
| 2019/0266492 A1 | 8/2019 | Harang et al. |
| 2019/0295114 A1 | 9/2019 | Pavletic et al. |
| 2019/0347287 A1 | 11/2019 | Crossno et al. |
| 2019/0378050 A1 | 12/2019 | Edkin et al. |
| 2019/0387005 A1 | 12/2019 | Zawoad et al. |
| 2020/0097817 A1 | 3/2020 | Harris et al. |
| 2020/0104636 A1 | 4/2020 | Halevi et al. |
| 2020/0228998 A1 | 7/2020 | Bai et al. |
| 2020/0250309 A1 | 8/2020 | Harang et al. |
| 2020/0257799 A1 | 8/2020 | Saxe et al. |
| 2020/0311586 A1 | 10/2020 | Sandstrom |
| 2020/0342337 A1 | 10/2020 | Choudhary et al. |
| 2021/0014247 A1 | 1/2021 | Wosotowsky et al. |
| 2021/0073661 A1 | 3/2021 | Matlick et al. |
| 2021/0092140 A1 | 3/2021 | Kazerounian et al. |
| 2021/0120013 A1 | 4/2021 | Hines et al. |
| 2021/0168165 A1 | 6/2021 | Alsaeed et al. |
| 2021/0211450 A1 | 7/2021 | Aleidan |
| 2021/0241175 A1 | 8/2021 | Harang et al. |
| 2021/0326440 A1 | 10/2021 | Saxe et al. |
| 2021/0328801 A1 | 10/2021 | Sly et al. |
| 2021/0328969 A1 | 10/2021 | Gaddam et al. |
| 2021/0397956 A1 | 12/2021 | Rasamsetti et al. |
| 2022/0036194 A1 | 2/2022 | Sundaresan et al. |
| 2022/0083900 A1 | 3/2022 | Khanna |
| 2022/0124543 A1 | 4/2022 | Orhan et al. |
| 2022/0353284 A1 | 11/2022 | Vörös et al. |
| 2023/0089380 A1 | 3/2023 | Jiang et al. |
| 2023/0229772 A1 | 7/2023 | Saxe et al. |

FOREIGN PATENT DOCUMENTS

| | | |
|---|---|---|
| WO | WO 2007/117636 A2 | 10/2007 |
| WO | WO-2019071095 A1 | 4/2019 |
| WO | WO 2019/150079 A1 | 8/2019 |
| WO | WO-2019145912 A1 | 8/2019 |
| WO | WO 2019/166989 A1 | 9/2019 |
| WO | WO-2020030913 A1 | 2/2020 |
| WO | WO-2020157479 A1 | 8/2020 |
| WO | WO-2022223940 A1 | 10/2022 |

OTHER PUBLICATIONS

Ba, et al., "Layer Normalization." [Online] Retrieved from the Internet ttps://arxiv.org/pdf/1607.06450.pdf>, Submitted on Jul. 21, 2016, 14 pages.

Harang, R. "Estimating weight sharing in multi-task networks via approximate Fisher information," SOPHOS, [online] Retrieved from the Internet https://www.camlis.org/s/harang_CAMLIS17.pdf> Oct. 28, 2017, 31 pages.

Huang, L. et al., "Orthogonal Weight Normalization: Solution to Optimization over Multiple Dependent Stiefel Manifolds in Deep Neural Networks," [Online], Retrieved from the Internet: <URL: https://arxiv.org/pdf/1709.06079.pdf>, Nov. 21, 2017, 20 pages.

(56) References Cited

OTHER PUBLICATIONS

Ioffe and Szegedy, "Batch Normalization: Accelerating Deep Network Training by Reducing Internal Covariate Shift." [Online] Retrieved from the Internet https://arxiv.org/pdf/1502.03167v3.pdf>, Submitted on Feb. 11, 2015 (v1), last revised Mar. 2, 2015 (this version, v3), 11 pages.
Kirkpatrick, J. et al., "Overcoming catastrophic forgetting in neural networks," PNAS (2017); 114 (13): 3521-3526.
Liao and Carneiro, "On the Importance of Normalisation Layers in Deep Learning with Piecewise Linear Activation Units." [Online] Retrieved from the Internet https://arxiv.org/pdf/1508.00330.pdf>, Submitted on Aug. 3, 2015 (v1), last revised Nov. 1, 2015 (this version, v2), 7 pages.
Liao, et al., "Streaming Normalization: Towards Simpler and More Biologically-plausible Normalizations for Online and Recurrent Learning." Center for Brains, Minds & Machines, Memo No. 057, [Online] Retrieved from the Internet https://arxiv.org/pdf/1610.06160.pdf>, Oct. 19, 2016, 21 pages.
Lundberg, S. M. et al., "A Unified Approach to Interpreting Model Predictions," 31st Conference on Neural Information Processing Systems (NIPS 2017), Long Beach, CA, USA, 10 pages.
Montavon, G. et al., "Methods for Interpreting and Understanding Deep Neural Networks," [Online], Retrieved from the Internet: <URL: https://arxiv.org/pdf/1706.07979.pdf>, Jun. 24, 2017, 14 pages.
Pascanu, R. et al., "Revisiting natural gradient for deep networks," [Online], Retrieved from the Internet: <URL: https:/arxiv.org/pdf/1301.3584v7.pdf>, Feb. 17, 2014, 18 pages.
Ribeiro, M. T. et al., "Model-Agnostic Interpretability of Machine Learning," [Online], Retrieved from the Internet: <URL: https://arxiv.org/pdf/1606.05386.pdf>, Jun. 16, 2016, 5 pages.
Ribeiro, M. T. et al., "'Why Should I Trust You?' Explaining the Predictions of Any Classifier," [Online], Retrieved from the Internet: <URL: https://arxiv.org/pdf/1602.04938v3.pdf>, Aug. 9, 2016, 10 pages.
Ribeiro, M. T., "LIME—Local Interpretable Model-Agnostic Explanations," [Online Blog], Retrieved from the Internet: <URL: https://homes.cs.washington.edu/~marcotcr/blog/lime/>, Apr. 2, 2016, 7 pages.
Salimans, T. et al., "Weight Normalization: A Simple Reparameterization to Accelerate Training of Deep Neural Networks," [Online], Retrieved from the Internet: <URL: https://arxiv.org/pdf/1602.07868.pdf>, Jun. 4, 2016, 11 pages.
Srivastava, et al., "Dropout: A Simple Way to Prevent Neural Networks from Overfitting." Journal of Machine Learning Research (2014); 15: 1929-1958. Submitted Nov. 2013; Published Jun. 2014, 30 pages.
Theis, L. et al., "Faster gaze prediction with dense networks and Fisher pruning," [Online], Retrieved from the Internet: <URL: https://arxiv.org/pdf/1801.05787.pdf>, Jan. 17, 2018, 10 pages.
Tolomei, G. et al., "Interpretable Predictions of Tree-based Ensembles via Actionable Feature Tweaking," [Online], Retrieved from the Internet: <URL: https://arxiv.org/pdf/1706.06691.pdf>, Jun. 20, 2017, 10 pages.
Tu, M. et al., "Ranking the parameters of deep neural networks using the Fisher information," 41st IEEE International Conference on Acoustics, Speech and Signal Processing, ICASSP 2016—Shanghai, China, Institute of Electrical and Electronics Engineers Inc., pp. 2647-2651 (2016).
Wu, et al., "L1-Norm Batch Normalization for Efficient Training of Deep Neural Networks." [Online] Retrieved from the Internet https://arxiv.org/pdf/1802.09769.pdf>, Submitted on Feb. 27, 2018, 8 pages.
U.S. Appl. No. 15/884,542, Office Action dated Sep. 9, 2021, 44 pages.
U.S. Appl. No. 16/257,749, Office Action dated Aug. 11, 2020, 14 pages.
U.S. Appl. No. 16/257,749, Notice of Allowance dated Mar. 1, 2021, 10 pages.
U.S. Appl. No. 15/884,542, Office Action dated Mar. 4, 2021, 53 pages.
U.S. Appl. No. 15/907,807, Office Action dated Apr. 27, 2021, 18 pages.
Augasta and Kathirvalavakumar, "Pruning algorithms of neural networks—a comparative study", Cent. Eur. J. Comp. Sci. (2013); 3(3): 105-115.
Cheplyaka, R., "Rank vs Order in R", Oct. 30, 2017 https://ro-che.info/articles/2016-03-19-rank-vs-order-r (Year: 2017), 4 pages.
Chiba, et al., "Analyzing Spatial Structure of IP Addresses for Detecting Malicious Websites", Journal of Information Processing (Jul. 2013); 21(3): 539-550.
Engelbrecht, Andries P., "A New Pruning Heuristic Based on Variance Analysis of Sensitivity Information", IEEE Transactions on Neural Networks (Nov. 2001); vol. 12, No. 6, pp. 1386-1399.
Tseng, Huihsin et al, U.S. Appl. No. 62/483,102, filed Apr. 7, 2017, 19 pages.
Kang, et al., "Malware Classification Method via Binary Content Comparison", RACS'12, Oct. 23-26, 2012, San Antonio, TX, USA (2012); 6 pages, https://dl.acm.org/doi/pdf/10.1145/2401603.2401672.
Kim, Hae-Jung, "Image-Based Malware Classification Using Convolutional Neural Network", In: Park J., Loia V., Yi G., Sung Y. (eds) Advances in Computer Science and Ubiquitous Computing. Lecture Notes in Electrical Engineering (2018); vol. 474, pp. 1352-1357.
Lison and Mavroeidis, "Neural Reputation Models learned from Passive DNS Data", "Neural reputation models learned from passive DNS data," 2017 IEEE International Conference on Big Data (Big Data), Boston, MA (Dec. 11-14, 2017); pp. 3662-3671, doi: 10.1109/BigData.2017.8258361.
Pennington and Worah, et al., "The Spectrum of the Fisher Information Matrix of a Single-Hidden-Layer Neural Network", 32nd Conference on Neural Information Processing Systems (NeurIPS 2018), Montréal, Canada, pp. 1-16.
Shah, S., et al., "Virus Detection using Artificial Neural Networks; International Journal of Computer Applications", International Journal of Computer Applications (0975-8887) (Dec. 2013); vol. 84, No. 5, pp. 17-23.
Tu, M., et al., "Reducing the Model Order of Deep Neural Networks Using Information Theory", IEEE Computer Society (2016); 2016 IEEE Computer Society Annual Symposium on VLSI, pp. 93-98.
U.S. Appl. No. 16/263,264, Office Action dated Feb. 22, 2022, 13 pages.
International Search Report and Written Opinion for International Patent Application No. PCT/US2018/054558, dated Dec. 10, 2018, 6 pages.
Rudd, E.R., et al., "MOON: A Mixed Objective Optimization Network for the Recognition of Facial Attributes." [Online], Retrieved from the Internet: <URL:https://arxiv.org/abs/1603.07027>, arXiv:1603.07027 [cs.CV] , Mar. 22, 2016, 17 pages.
Santos and Torres, "Macro Malware Detection using Machine Learning Techniques—A New Approach." In Proceedings of the 3rd International Conference on Information Systems Security and Privacy (ICISSP 2017, SCITEPRESS—Science and Technology Publications, Lda), pp. 295-302, ISBN: 978-989-758-209-7, ElevenPaths, Telefónica Digital Cyber Security Unit, Madrid, Spain. [Online], Retrieved from the Internet on Nov. 19, 2018: http://www.scitepress.org/Papers/2017/61322, 8 pages.
Saxe and Berlin, "Deep Neural Network Based Malware Detection Using Two Dimensional Binary Program Features," IEEE 2015,10th International Conference on Malicious and Unwanted Software: "Know Your Enemy" (Malware), 2015, pp. 11-20.
Saxe and Berlin, "eXpose: A Character-Level Convolutional Neural Network with Embeddings for Detecting Malicious URLs, File Paths and Registry Keys." [Online], Retrieved from the Internet: <https://arxiv.org/abs/1702.08568>, arXiv:1702.08568v1 [cs.CR], Feb. 27, 2017, 18 pages.
Tahan, G., et al., "Mal:ID: Automatic Malware Detection Using Common Segment Analysis and Meta-Features." Journal of Machine Learning (2012); (Submitted Aug. 2011; Published Feb. 2012); 1: 1-48, 33 pages.

(56) References Cited

OTHER PUBLICATIONS

Deo, A., et al., "Prescience: Probabilistic Guidance on the Retraining Conundrum for Malware Detection", AISec '16 Proceedings of the 2016 ACM Workshop on Artificial Intelligence and Security, Oct. 28, 2016, Vienna, Austria, Retrieved from the Internet http://delivery.acm.org/10.1145/3000000/2996769/p71-deo.pdf?ip=69.125.105.131&id=2996769&acc=OPENTOC&key=4D4702B0C3E38B35%2E4D4702B0C3E38B35%2E4D4702B0C3E38B35%2E9F04A3A78F7D3B8D&__acm__=1573741004_98b035a9ad71ffc3e5289851a65d39e7, 12 pages.

Harang and Ducau, "Measuring the speed of the Red Queen's Race", BlackHat USA 2018, Aug. 4-9, 2018, Las Vegas, NV, USA, 18 pages.

Harang and Ducau, "Measuring the speed of the Red Queen's Race", SOPHOS Presentation (2018), Retrieved from the Internet https://i.blackhat.com/us-18/Wed-August-8/us-18-Harang-Measuring-the-Speed-of-the-Red-Queens-Race.pdf, 48 pages.

Harang and Rudd, "Principled Uncertainty Estimation for Deep Neural Networks". [Online] arXiv:1810.12278 [cs.LG], [v1] Oct. 29, 2018, Retrieved from the Internet https://arxiv.org/abs/1810.12278v1.pdf, 8 pages.

International Preliminary Report on Patentability for International Patent Application No. PCT/US2018/054558, dated Apr. 8, 2020, 5 pages.

International Search Report and Written Opinion for International Patent Application No. PCT/GB2019/050199, dated Mar. 29, 2019, 15 pages.

International Search Report and Written Opinion for International Patent Application No. PCT/IB2019/050642, dated Apr. 12, 2019, 12 pages.

International Search Report and Written Opinion for International Patent Application No. PCT/IB2019/051629, dated Jun. 17, 2019, 14 pages.

International Search Report and Written Opinion for International Patent Application No. PCT/GB2019/052222, dated Nov. 12, 2019, 17 pages.

International Search Report and Written Opinion for International Patent Application No. PCT/GB2020/050188, dated Mar. 31, 2020, 12 pages.

Kardan and Stanley, "Fitted Learning: Models with Awareness of their Limits". [Online] arXiv:1609.02226v4 [cs.AI] Jul. 9, 2018, Retrieved from the Internet https://arxiv.org/pdf/1609.02226.pdf, 19 pages.

Narayanan, et al., "A multi-view context-aware approach to Android malware detection and malicious code localization." Empir Software Eng (2018); 23: 1222-1274. Epub Aug. 30, 2017.

Rudd, et al., "MEADE: Towards a Malicious Email Attachment Detection Engine", 2018 IEEE International Symposium on Technologies for Homeland Security (HST), IEEE, Oct. 23, 2018, pp. 1-7.

Rudd, et al., "The Extreme Value Machine". [Online] arXiv:1506.06112v4 [cs.LG] May 21, 2017, Retrieved from the Internet https://arxiv.org/abs/1506.06112.pdf, 12 pages.

Sanghani, et al., "Personalized spam filtering using incremental training of support vector machine". 2016 International Conference on Computing, Analytics and Security Trends (CAST), IEEE Dec. 19, 2016, pp. 323-328, 6 pages.

Schultz, et al., "Data Mining Methods for Detection of New Malicious Executables", Proceedings of the 2001 IEEE Symposium on Security and Privacy (2001); Oakland, CA, May 14-16, 2001; [Proceedings of the IEEE Symposium on Security and Privacy], Los Alamitos, CA: IEEE Comp. Soc., US, May 14, 2001, pp. 38-49, 12 pages.

Sethi and Kantardzic, "Handling adversarial concept drift in streaming data". Expert Systems With Applications (May 1, 2018); 97: 18-40. Available online Dec. 11, 2017.

Tian, et al., "An automated classification system based on the strings of trojan and virus families." Malicious and Unwanted Software (Malware); 2009 4th International Conference, Piscataway, NJ, USA, Oct. 13, 2009, pp. 23-30, 8 pages.

Velez and Clune, Identifying Core Functional Networks and Functional Modules within Artificial Neural Networks via Subsets Regression, GECCO '16, Proceedings of the Genetic and Evolutionary Computation Conference 2016, Jul. 20-24, 2016, pp. 181-188.

Notice of Allowance in U.S. Appl. No. 15/727,035, dated Dec. 27, 2019, 7 pages.

Chiba, Daiki et al., "Detecting Malicious Websites by Learning IP Address Features", 2012 IEEE/IPSJ 12th International Symposium on Applications and the Internet, Jul. 16, 2012 (Jul. 16, 2012), pp. 29-39.

International Search Report and Written Opinion for International Application No. PCT/GB2022/050681, dated Jun. 20, 2022, 14 pages.

U.S. Appl. No. 15/884,542, Office Action dated Apr. 5, 2022, 32 pages.

U.S. Appl. No. 15/884,542, Office Action dated Sep. 21, 2022, 32 pages.

U.S. Appl. No. 16/853,803, Office Action dated May 2, 2022, 9 pages.

Buitinck, L., et al., "API design for machine learning software: experiences from the scikit-learn project", arXiv preprint (2013); 16 pages.

Dai, J., et al., "Efficient Virus Detection Using Dynamic Instruction Sequences", Journal of Computers (May 2009); 4(5): 405-414.

Devi, D., et al., "Detection of packed malware", SecurIT'12 (Aug. 17-19, 2012); p. 22.

Elovici, Y., et al., "Applying machine learning techniques for detection of malicious code in network traffic", KI 2007: Advances in Artificial Intelligence: 30th Annual German Conference on AI, KI 2007, Osnabrück, Germany (Sep. 10-13, 2007); Proceedings 30, Springer Berlin Heidelberg (2007); 44-50.

Henchiri, O., et al., "A feature selection and evaluation scheme for computer virus detection", Proceedings of the Sixth International Conference on Data Mining (ICDM'06), IEEE Computer Society (2006); 5 pages.

Joachims, T., "Making large-scale SVM learning practical LS-8 Report 24", Technical Report, University of Dortmund (1998); 18 pages.

Kecman, V., "Support vector machines—an introduction", StudFuzz, Springer-Verlag Berlin Heidelberg (2005); 177: 1-11.

Kolter, J. Z., et al., "Learning to detect and classify malicious executables in the wild", Journal of Machine Learning Research (2006); 7(12): 2721-2744.

Kolter, J. Z., et al., "Learning to detect malicious executables in the wild", Proceedings of the Tenth ACM SIGKDD International Conference on Knowledge Discovery and Data Mining (2004); 9 pages.

Menahem, E., et al., "Improving malware detection by applying multi-inducer ensemble", Computational Statistics & Data Analysis (2009); 53: 1483-1494.

Monnappa, K. A., "Introduction to Malware Analysis", Learning Malware Analysis: Explore the concepts, tools, and techniques to analyze and investigate Windows malware, Packt Publishing Ltd., Birmingham—Mumbai (2018); Chapter 1: pp. 7-10; Chapter 9: p. 362; 9 pages.

Mukkamala, S., et al., "Intrusion detection using an ensemble of intelligent paradigms", Journal of Network and Computer Applications (2005); 28(2): 167-182.

Russell, S. J., "Kernel Machines", Artificial Intelligence A Modern Approach, Pearson Education International (2010); Section 20(6): 749-751.

Sikorski, M., et al., "Practical malware analysis: the hands-on guide to dissecting malicious software", no starch press (2012); pp. 2-3; pp. 11-13; p. 384; 12 pages.

Souppaya, M., et al., "Guide to malware incident prevention and handling for desktops and laptops", NIST Special Publication 800-83 Revision 1 (2013); 47 pages.

U.S. Appl. No. 15/727,035, Office Action dated Aug. 14, 2019, 11 pages.

U.S. Appl. No. 15/884,542, Advisory Action dated Dec. 6, 2022, 3 pages.

U.S. Appl. No. 15/884,542, Office Action dated Jan. 26, 2023, 32 pages.

(56) References Cited

OTHER PUBLICATIONS

U.S. Appl. No. 15/907,807, Notice of Allowance dated Oct. 20, 2021, 5 pages.
U.S. Appl. No. 16/263,264, Corrected Notice of Allowability dated Jan. 5, 2023, 2 pages.
U.S. Appl. No. 16/263,264, Notice of Allowance dated Oct. 4, 2022, 9 pages.
U.S. Appl. No. 16/853,803, Notice of Allowance dated Nov. 30, 2022, 7 pages.
U.S. Appl. No. 17/314,625, Corrected Notice of Allowability dated Mar. 29, 2023, 2 pages.
U.S. Appl. No. 17/314,625, Notice of Allowance dated Mar. 7, 2023, 10 pages.
Wang, T., et al., "Detecting unknown malicious executables using portable executable headers", 2009 Fifth International Joint Conference on INC, IMS and IDC. IEEE (2009); 1 page.
Wilding, Ed., "The authoritative international publication on computer virus prevention, recognition and removal", Virus Bulletin (Nov. 1990); 24 pages.
Ye, Y., et al., "SBMDS: an interpretable string based malware detection system using SVM ensemble with bagging", Journal in Computer Virology (2009); 5: 283-293.
Ye, Y., et al., "Hierarchical associative classifier (HAC) for malware detection from the large and imbalanced gray list", Journal of Intelligent Information Systems (2010); 35: 1-20.
Notice of Allowance for U.S. Appl. No. 15/884,542 dated Jul. 13, 2023, 13 pages.
Tahan, G., et al., "Mal-id: Automatic malware detection using common segment analysis and meta-features", Journal of Machine Learning Research (2012); 13: 949-979.
U.S. Appl. No. 17/239,128, Office Action dated Jul. 12, 2023, 33 pages.

* cited by examiner

METHODS AND APPARATUS FOR PRESERVING INFORMATION BETWEEN LAYERS WITHIN A NEURAL NETWORK

BACKGROUND

The embodiments described herein relate to methods and apparatus for preserving information between layers within a neural network. More particularly, the embodiments described herein relate to methods and apparatus for normalization of inputs using a normalization layer and including one or more parameters, used during normalization, as additional inputs to an activation layer, to preserve information across the layers of the neural network.

Some known machine learning models, including neural networks, can have multiple different layers, where each layer includes multiple nodes. In some embodiments nodes belonging to different layers have interconnections with other nodes to define a network. This network of multiple nodes can be used to classify data, files, documents, images and/or the like.

The use of machine learning tools, including neural networks, can include one or more steps of data pre-processing such as input normalization. Normalization, for example, can be used to stabilize the behavior of the neural network. Some known implementations of normalization, however, cause the loss of information about the absolute scaling of the data between layers of the neural network.

Thus, a need exists for improved apparatuses and methods for preserving information between layers of a neural network.

SUMMARY

In some embodiments, an apparatus includes a memory and a processor. The processor is configured to extract a set of features from a potentially malicious file and provide the set of features as an input to a normalization layer of a neural network. The processor is configured to implement the normalization layer by calculating a set of parameters associated with the set of features and normalizing the set of features based on the set of parameters to define a set of normalized features. The processor is further configured to provide the set of normalized features and the set of parameters as inputs to an activation layer of the neural network such that the activation layer produces an output based on the set of normalized features and the set of parameters. The output can be used to produce a maliciousness classification of the potentially malicious file.

DETAILED DESCRIPTION

Figure 1:
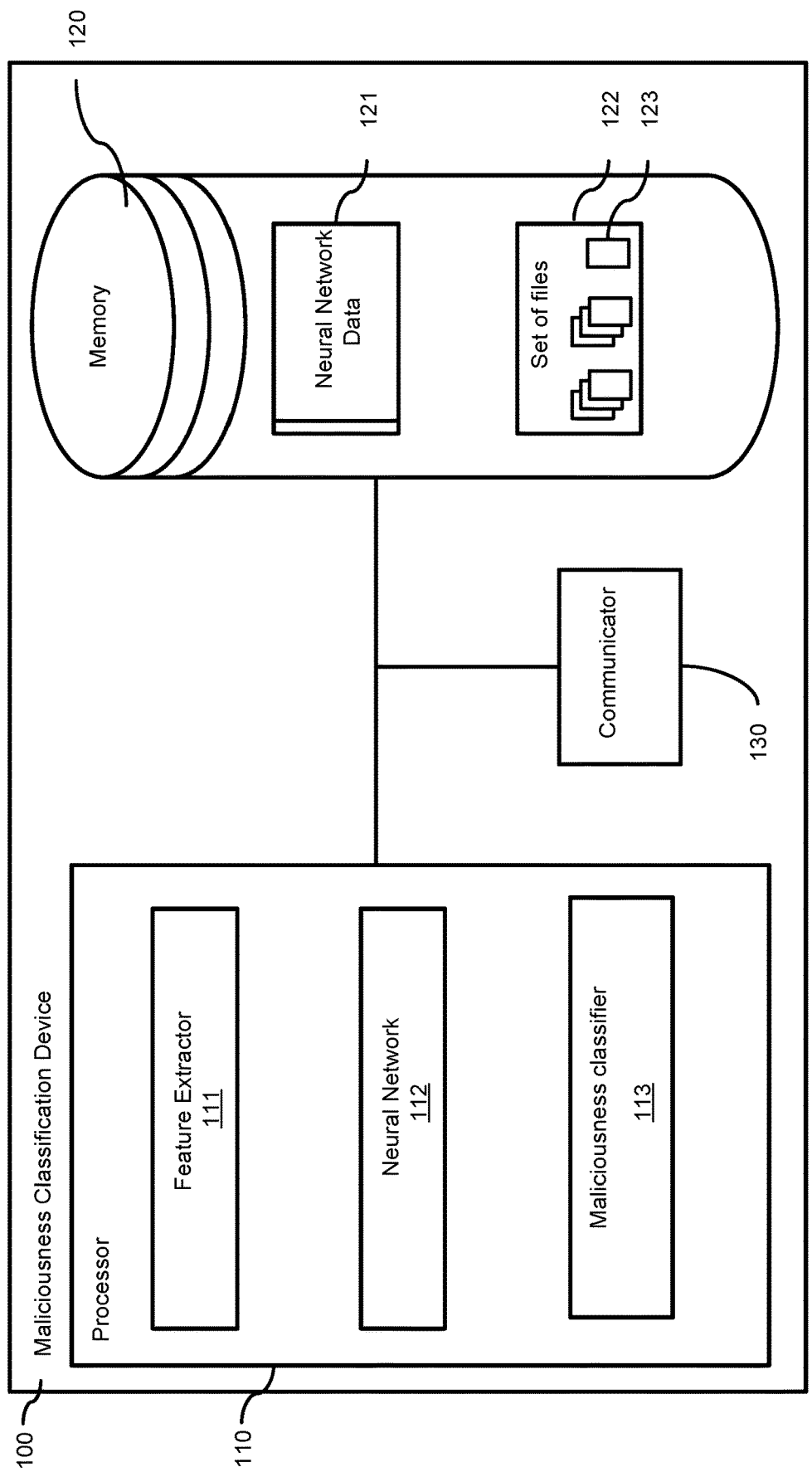
FIG. 1 is a schematic block diagram of a Maliciousness Classification Device for evaluating and classifying a potentially malicious file, according to an embodiment.

In some embodiments, an apparatus includes a memory and a processor operatively coupled to the memory. The processor can be configured to extract a set of features from a potentially malicious file and provide the set of features as an input to a normalization layer of a neural network used to classify the potentially malicious file. The processor is configured to implement the normalization layer by calculating a set of parameters associated with the set of features and normalizing the set of features based on the set of parameters to define a set of normalized features. The processor is configured to provide the set of normalized features and the set of parameters as inputs to an activation layer of the neural network such that the activation layer produces an output (1) based on the set of normalized features and the set of parameters and (2) used to produce a maliciousness classification of the potentially malicious file. In some embodiments, the processor can be configured to, train the neural network using files having a maliciousness classification known to the neural network, and then test the performance of the neural network in classifying files having a maliciousness classification unknown to the neural network.

In some embodiments, a non-transitory processor-readable medium stores code representing instructions to be executed by a processor. The code includes code to cause the processor to receive, at a normalization layer of a neural network used to classify a file, a set of values associated with the file. The code includes code to cause the processor to calculate, at the normalization layer, a mean of the set of values, calculate, at the normalization layer, a standard deviation of the set of values, and normalize, at the normalization layer, the set of values based on the mean and the standard deviation to define a set of normalized values. The code includes code to cause the processor to provide to an activation layer of the neural network the set of normalized values, the mean, and the standard deviation, and to calculate, at the activation layer and based on the set of normalized values, the mean, and the standard deviation, a set of results used to classify the file.

In other embodiments, a method includes receiving a set of values at a normalization layer of a neural network implemented in a processor of a compute device. The method further includes calculating, at the processor, a set of parameters associated with the set of values, normalizing, at the processor, the set of values based on the set of parameters to define a set of normalized values, and providing the set of normalized values and the set of parameters to an activation layer of the neural network such that the activation layer identifies a set of results based on the set of normalized values and the set of parameters.

While the methods and apparatus are described herein as processing and/or classifying files, in other instances a maliciousness classification device (such as maliciousness classification device 100 of FIG. 1) can be used to process and/or classify any collection or stream of artifacts, events, objects, and/or data. As an example, a maliciousness classification device can process and/or classify an artifact such as, for example, any portable executable file(s), registry key(s), dataset(s), filepath(s), Uniform Resource Locator (URL), device(s), device behavior, user behavior, network behavior, network identifier, and/or entity represented and/or associated with computer-related resources. For further examples, an artifact can include a function of software code, a webpage(s), a data file(s), a model file(s), a source file(s), a script(s), a process, a binary executable file(s), a table(s) in a database system, a development deliverable(s), an active content(s), a word-processing document(s), an e-mail message(s), a text message, a network address, a device or entity (e.g., a network-connected compute device and/or computer system, a server, a smartphone, a tablet a laptop, a multimedia device, etc.), a network address (e.g., a Media. Control (MAC) address, Internet Protocol (IP) address, etc.) of a compute device, and/or the like.

As another example, a maliciousness classification device can process and/or classify an event stream such as a series of function calls and/or instructions, an occurrence of specific data types and/or instructions within a given time period, a series of network traffic events, and/or the like. As yet another example, a maliciousness classification device can process and/or classify data streams including, for example, video data, image data, audio data, textual data, and/or the like. As a further example, a maliciousness classification device can process and/or classify configuration data such as, for example, device settings, network settings, application settings, registry keys, and/or the like.

FIG. 1 is a schematic block diagram of a maliciousness classification device 100 for evaluating potentially malicious files, according to an embodiment. The maliciousness classification device 100, also referred to herein as "the classification device" or "the device", can be a hardware-based computing device and/or a multimedia device, such as, for example, a compute device, a server, a desktop compute device, a smartphone, a tablet, a wearable device, a laptop and/or the like. The maliciousness classification device 100 includes a processor 110, a memory 120 and a communicator 130.

The processor 110 can be, for example, a hardware based integrated circuit (IC) or any other suitable processing device configured to run and/or execute a set of instructions or code. For example, the processor 110 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 110 is operatively coupled to the memory 120 through a system bus (for example, address bus, data bus and/or control bus).

The processor 110 can include a feature extractor 111, a neural network 112, and a maliciousness classifier 112. Each of the feature extractor 111, the neural network 112, and/or the maliciousness classifier 112, can be software stored in memory 120 and executed by processor 110 (e.g., code to cause the processor 110 to execute the feature extractor 111, the neural network 112, and/or the maliciousness classifier 112 can be stored in the memory 120) and/or a hardware-based device such as, for example, an ASIC, an FPGA, a CPLD, a PLA, a PLC and/or the like.

The feature extractor 111 can be configured to receive a file as an input and output a feature vector associated with the file. The feature extractor 111 extracts features from the file and forms a feature vector including indications of these features (and/or otherwise identifies a set of values associated with the file). More specifically, in some implementations, the feature extractor 111 identifies features in the file (for example, headers, variable definitions, routines, subroutines, strings, elements, subtrees, tags and/or the like). A representation of these features can be used to define a feature vector. For example, the feature extractor 111 can normalize each feature and/or input each feature to a hash function to produce a hash value. The feature extractor 111, using the hash values, can form a feature vector (e.g., of pre-determined length and/or of variable length).

For example, in some implementations, the feature extractor 111 can be configured to extract and/or identify features of a word processing file (e.g., a '.doc' file). The features can, for example, include internal representations of the document (e.g., text streams, embedded Visual Basic Application (VBA) code, and/or metadata associated with word processing file). The feature extractor 111 can then, for example, tokenize the extracted features into printable strings by not including XML delimiting characters ('<' or '>'), removing any length less than a specified length (e.g., 5 characters) and/or other tokenizing techniques. The feature extractor 111 can then provide each feature as an input to a hash function to generate a hash value for that feature. The feature extractor 112 can use the hash values to form a feature vector representative of and/or indicative of the features in the word processing file. In some instances, the hashing can be performed to reduce the feature space into a set of blocks having a pre-determined size (for example, a block size of 512, a block size of 1024, a block size of 2048 and/or the like).

In other implementations, any other suitable processes, characteristics and/or values can be used to define the feature vector and/or set of values associated with the file. For example, in some instances, the feature vector can be formed from extracted features based on a lookup table, a data map, an associative array, and/or any other data structure and/or function. Such a function can be used instead of or in addition to a hash function. For another example, any other data extracted and/or calculated from the file such as string length values associated with strings within the file, a variance of string length values associated with strings within the file, informational entropy values associated with the file (e.g., calculated based on a frequency of byte values, sequences and/or patterns within one or more byte windows of the file), byte values within the file, values computed based on byte values within the file (e.g., byte value ranges within the file, a standard deviation associated with byte values in the file, etc.) a length of the file, an author of the file, a publisher of the file, a compilation date of the file, data pertaining to whether a valid signature is included with the file, other information that can be parsed from a Portable Executable (PE) file (including but not limited to the size of the header and/or the size of components of the file, such as image sizes and/or the size of the code, versions of operating systems configured to run and/or open the file, section names, entry points, symbol table information, and/or similar information), images and/or representation of images associated with the file, and/or the like, can be used to define the feature vector and/or set of values associated with the file. Additional detail regarding such data extracted and/or calculated from the file can be found in U.S. patent application Ser. No. 15/228,728, filed Aug. 4, 2016 and titled "Methods and Apparatus for Machine Learning Based Malware Detection, now U.S. Pat. No. 9,690,938, and U.S. patent application Ser. No. 15/343,844, filed Nov. 4, 2016 and titled "Methods and Apparatus for Detecting Malware Samples with Similar Image Sets," now U.S. Pat. No. 9,672,358, each of which is incorporated herein by reference in its entirety.

The neural network 112 can be a neural network configured to have an input layer, an output layer, and one or more hidden layers including a normalization layer and an activation layer, as described in further detail herein. The neural network 112 can be configured to receive a feature vector, or a set of values associated with of a file in the form of an input vector, at the input layer, iteratively perform computations based on the inputs, using the normalization and activation layers of the one or more hidden layers, and output, via the output layer, an indication associated with classification of the file. For example, the neural network 112 can provide an output indicating a maliciousness classification of a file. The maliciousness classification can include information regarding whether a file is classified as a threat. The maliciousness classification can classify a file into different categories such as, for example, benign, potentially malicious, malicious content, type of malicious content, class of malicious content, malware family and/or the like.

In some instances, the neural network 112 can have connected nodes in different layers (for example, input layer, hidden layer(s) and/or output layer) of the neural network 112. For example, the neural network 112 can perform one or more tasks such as, for example, performing content classification, performing behavior classification, categorizing different file types, classifying different image types and/or the like. Content classification and behavior classification may be used, for example, to identify the likelihood that a file or a behavior is associated with a security threat (e.g., malware). Further, the neural network 112 can have one or more specific nodes in the normalization layer of the one or more hidden layers for the input of one or more parameters associated with normalization of the inputs, (e.g., the set of features from the input layer or a set of features from a previous hidden layer). For example, the neural network 112 performing malware classification based on features extracted from various files can have normalization layers including nodes to calculate and provide normalized data as well as nodes to calculate and provide one or more parameters used for normalization (e.g., mean, variance, standard deviation, etc.) to the corresponding activation layer of that hidden layer, as described in further detail herein (with respect to FIGS. 2 and 3).

The maliciousness classifier 113, also referred to herein as "the classifier", can be configured to receive the output of the neural network 112 and calculate or classify the maliciousness of the received file. For example, in some implementations, the classifier 113 can receive an output vector from the neural network 112 and produce a binary classification of whether the file is determined to be benign or malicious. In other implementations, for example, the classifier 113 can receive the output vector from the neural network 112 and produce a value associated with a confidence that the file is benign or malicious. In some other implementations, the classifier 113 can receive the output vector from the neural network 112 and based on the output vector, associate the file with a known class of malicious files among several known classes of malicious files.

The memory 120 of the maliciousness classification device 100 can be, for example, a random access memory (RAM), a memory buffer, a hard drive, a read-only memory (ROM), an erasable programmable read-only memory (EPROM), and/or the like. The memory 120 can store, for example, one or more software modules and/or code that can include instructions to cause the processor 110 to perform one or more processes, functions, and/or the like (e.g., the feature extractor 111, the neural network 112, and/or the maliciousness classifier 113). In some implementations, the memory 120 can be a portable memory (e.g., a flash drive, a portable hard disk, and/or the like) that can be operatively coupled to the processor 110. In other instances, the memory can be remotely operatively coupled with the maliciousness classification device. For example, a remote database server can be operatively coupled to the maliciousness classification device.

The memory 120 can store neural network data 121 and a set of files 122. The neural network data 121 can include data generated by the neural network 112 during classification of a file (e.g., temporary variables, return addresses, and/or the like). The neural network data 121 can also include data used by the neural network 112 to process and/or analyze a file (e.g., weights associated with the nodes of a neural network 112, parameters associated with normalization of inputs by one or more normalization layers of the neural network 112, decision points associated with the neural network 112, and/or other information related to the neural network 112).

In some instances, the neural network data 121 can also include data used to train the neural network 112. In some instances, the training data can include multiple sets of data. Each set of data can contain at least one pair of an input file and an associated desired output value or label. For example, the training data can include input files pre-categorized into categories such as, for example, malicious files and benign files, or types of malicious files. The training data can be used to train the neural network 112 to perform classification of data and/or files. For example, the neural network 112 can be trained by using any suitable backpropagation algorithm.

The communicator 130 can be a hardware device operatively coupled to the processor 110 and memory 120 and/or software stored in the memory 120 and executed by the processor 110. The communicator 130 can be, for example, a network interface card (NIC), a Wi-Fi™ module, a Bluetooth® module and/or any other suitable wired and/or wireless communication device. Furthermore the communicator 130 can include a switch, a router, a hub and/or any other network device. The communicator 130 can be configured to connect the maliciousness classification device 100 to a communication network (not shown in FIG. 1). In some instances, the communicator 130 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communicator 130 can facilitate receiving and/or transmitting a file and/or a set of files through a communication network. In some instances, a received file can be processed by the processor 110 and/or stored in the memory 120 as described in further detail herein.

In use, the processor 110, included in the maliciousness classification device 100, can be configured to retrieve a file (such as, for example, file 123) belonging to a set of files (such as, for example, set of files 122) from the memory 120. The feature extractor 111, included in and/or executed by the processor 110, can be configured to receive the first file and extract a set of features from the first file (or otherwise identify a set of values associated with the file) to define a feature vector. This feature vector can be stored in the memory 120. The processor 110 can then be configured to provide the stored feature vector from the memory 120 to the neural network 112. The neural network 112 can be configured to analyze the feature vector to determine a classification associated with the first file. The processor 110 can be configured to store the determined classification in the memory 120.

The maliciousness classifier 113, included in the processor 110, can be configured to receive and evaluate the output of the neural network 112 and produce a maliciousness classification for the file (e.g., classify the file as benign or malicious, classify the file as a type of malware, etc.). For example, in some instances the classifier 113 can receive an output vector from the neural network 112 and evaluate the values in the output vector in combination with one or more preset criteria to determine a malware class to which the file 123 belongs.

As described herein, it is understood that a maliciousness classification device (similar to maliciousness classification device 100 shown and described with respect to FIG. 1) can include a neural network (such as the model 112) that can be trained to classify one or more files. A maliciousness classification device can implement the methods described herein to receive a file, extract suitable features vectors from the file, and use the extracted set of features to classify the file by implementing a neural network with a set of hidden layers including normalization layers and corresponding activation layers. The parameters used to normalize the set of features at a hidden layer are provided as inputs to the corresponding activation layer such that the information about the normalized set of features in the input can be used by the activation layer. The activation layer can calculate, based on the normalized set of features and the parameters used to normalize, a set of results that can be used to classify the file based on maliciousness.

Figure 2:
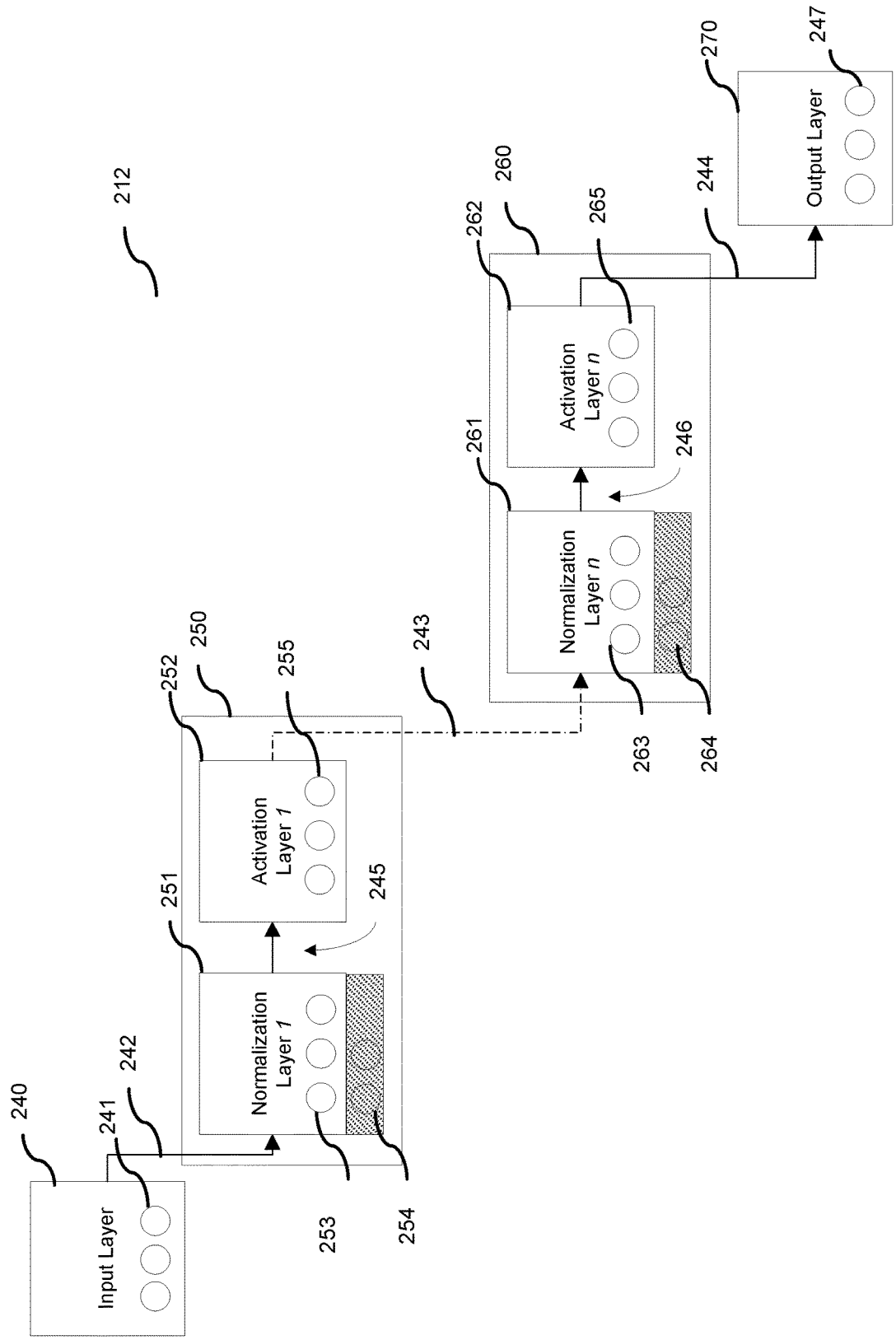
FIG. 2 is block diagram representing several layers of a neural network including portions adapted for preserving information across layers of the neural network, according to an embodiment.

FIG. 2 is a block diagram representation of a neural network 212, according to an embodiment. The neural network 212 can be a part of a maliciousness classification device such as the device 100 described with respect to FIG. 1. The neural network 212 can be the same as or substantially similar to the neural network 112 described above with respect to the device 100. For example, the neural network 212 can include an input layer 240, one or more hidden layers 250, 260, and an output layer 270. Each hidden layer 250, 260 can include a normalization layer (e.g. 251 and 261) and an activation layer (e.g. 252, 262). The input layer 240, the hidden layers 250, 260, and the output layer 270 can be connected by interlayer connections 242, 243, and 244 respectively. The normalization layer and the activation layer of each hidden layer can be connected by connections indicated by arrows 245 and 246.

The input layer 240 can include one or more input nodes 241 configured to receive an input vector associated with a set of features extracted from a file (e.g., file 123 indicated in FIG. 1). The input vector can be, in some implementations, a set of values associated with the file. In some implementations, for example, the number of input nodes can correspond to the size of the input vector or the number of values in the set of values associated with the file.

The neural network 212 can include any number of hidden layers, such as hidden layer-1, 250, and hidden layer-n, 260, each with a normalization layer (e.g. 251, 261) and an activation layer (e.g. 252, 262). The hidden layer 250 can be the initial hidden layer and hidden layer 260 can be the final hidden layer where "n" is the number of hidden layers. Any intermediary hidden layers are depicted by the dashed arrow of connection 243.

The normalization layers can include one or more normalization nodes (e.g. normalization nodes 253 and 263 of normalization layers 251 and 261 respectively). In some embodiments the number of normalization nodes can correspond to the size of the input vector of the set of features received from the input layer 240. The normalization nodes 253 can be configured to, when implemented, normalize the input vector or the set of values associated with the file, received from the input layer 241 via the connection(s) 242, using one or more parameters computed from the set of values in the input vector. For example, in some implementations input normalization can be done by subtracting, from each value of the set of values in the input vector, the mean of the set of values, and dividing, each of the mean-subtracted set of values of the input vector, by the standard deviation of the set of values of the input vector. The parameters, in this example, can be the mean and standard deviation of the inputs in the input vector of the set of features received from the input layer 240 at the normalization layer 251. As another example, the parameters for normalization by normalization layer 261 can be, for example, the mean and standard deviation of the set of values in the input vector of the set of features received from the previous activation layer (either activation layer 252 or a previous activation layer of a hidden layer depicted by the dashed line 243).

The normalization layers 251 and 261 also include one or mode parameter nodes such as parameter nodes 254 and 264 of normalization layers 251 and 261, respectively. The parameter nodes 254 and 264 can be configured to provide the parameters used during normalization (e.g., the mean and the standard deviation as discussed in the example above) by the normalization layer 251 or 261 to the activation layers 252, 262, respectively, as additional inputs, thereby preserving information about the set of features in the set of values in the input vector, which may otherwise be lost in the process of normalization. This allows the activation layers 252 and 262 to take the information regarding the normalization into consideration when performing calculations. Thus, where scale is important to the classification of the data and/or file, the scale can be used by the activation layers 252 and 253 and is not lost through normalization.

While normalization using the mean and standard deviation is disclosed as an example, in other implementations any other suitable normalization technique can be used and the associated parameters can be provided as inputs to the parameter nodes, as described in further detail herein. For example, decimal normalization, Min-Max normalization and/or the like can be used and the associated decimal scale factor of the min and max values can be provided as inputs to the subsequent activation layer using the parameter nodes.

The number of parameter nodes can correspond to the number of parameters to be provided to the activation layer to preserve information about the set of features in the set of values of the input vector. For example, in some implementations, where the provided parameters are the mean and standard deviation (or the variance) of the set of features to be normalized, the number of parameter nodes can be two, one providing the mean as the input and one providing the standard deviation (or variance) as the input to the activation layer. In other implementations, any number of any suitable parameters (e.g., moments like mean, variance, skewness, kurtosis, etc.) or any other suitable data pertaining to the input vector can be provided to the subsequent activation layer (e.g. 252,262) using a corresponding number of parameter nodes (e.g. 254, 264).

The activation layers 252, 262 can include one or more activation nodes 255 and 265. As described above, activation layers 252, 262 are often preceded by a normalization layer 251, 261 and serve to apply one or more activation functions on the inputs received (e.g., normalized inputs received from the preceding normalization layer 251, 261). Each activation node 255, 265 can be associated with an activation function that is applied to the weighted inputs received by that node through the associated connections (e.g., connections 245 between normalization nodes of layer 251 and activation nodes of layer 252, or connections 246 between normalization nodes of layer 261 and activation nodes of layer 262). In some instances, the number of activation nodes 255, 265 can correspond to the size of the input vector of the set of features received from the input layer 240). That is, in one or more activation layers 252, 262 of the neural network 212 the number of activation nodes 255, 265 can correspond to the number of normalization nodes 253, 263 (excluding the parameter nodes 254, 264) of the preceding normalization layer 251, 261. In such instances, each activation layer 252, 262 can have a number of inputs less than the number of outputs of the preceding normalization layer 251, 261. In other instances, one or more activation layers can include a number of activation nodes that is the same as the number of normalization nodes plus the number of parameter nodes in a preceding normalization layer. In such instances, each activation layer can have a number of inputs equal to the number of outputs of the preceding normalization layer.

The activation nodes 255, 265, in the activation layers 252, 262, can be configured to calculate, based on the normalized set of features and the parameters used to normalize by the preceding normalization layers 251, 261, respectively, a set of results that can be used to classify the file based on maliciousness. The activation nodes 255 can be configured to transform the vector received from the normalization layer 251 using the activation function in each activation node. Activation nodes can be used to transform inputs in various forms, including non-linear transformations, within a neural network. In some implementations, for example, the activation nodes can be Rectified Linear Units (ReLUs) implementing an activation function that is a linear rectifier. In other implementations, one or more activation nodes in one or more activation layers can be configured to implement any other suitable activation function such as sigmoid or logistic functions, hyperbolic tangent functions, softmax functions, and/or the like. In yet other implementations, one or more activation layers can also include activations nodes that can be leaky units (e.g., leaky ReLUs) or implement Maxout activation functions, or the like, to handle suitable data and training or testing conditions.

Figure 3:
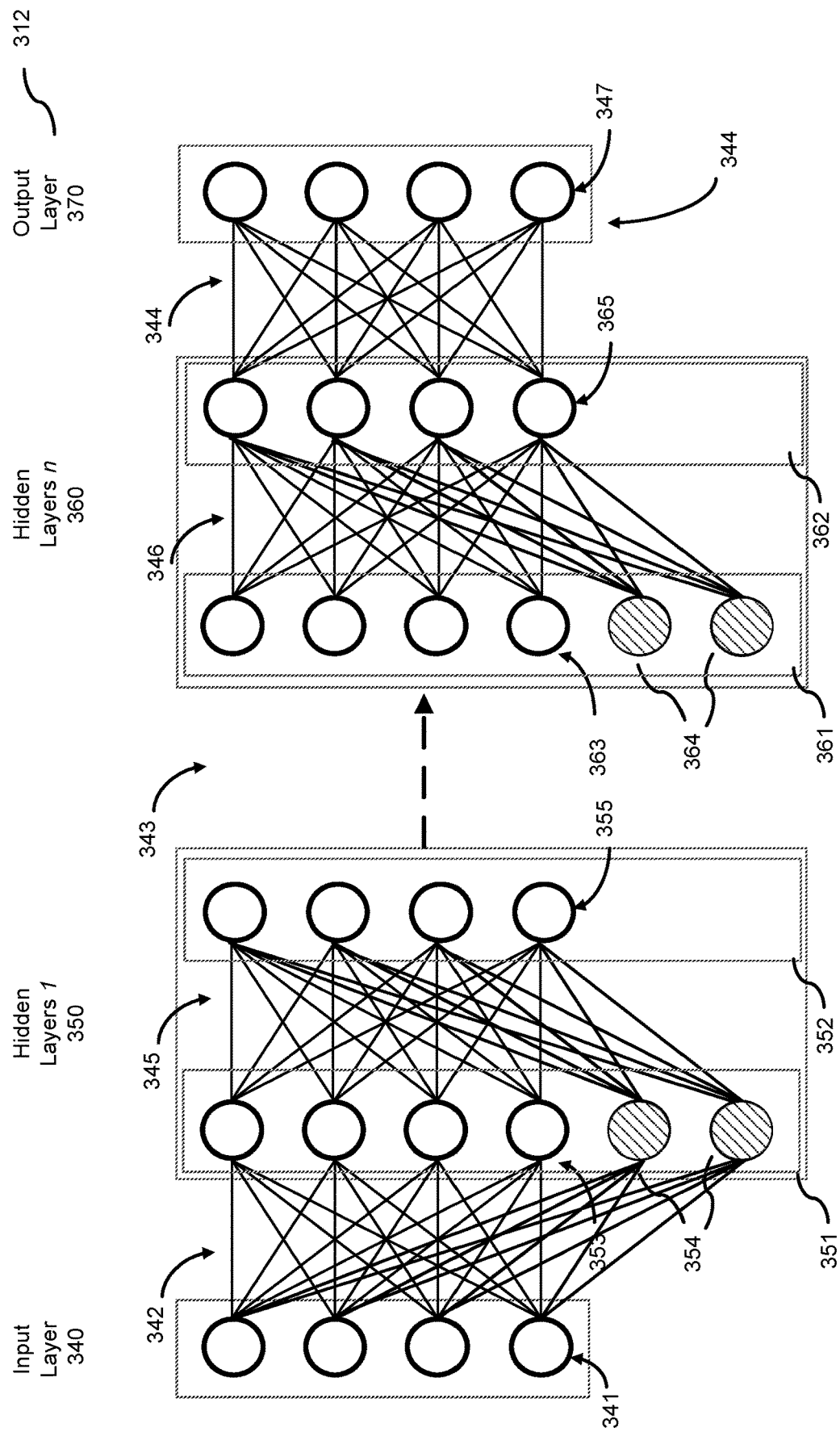
FIG. 3 is a schematic representation of a neural network including portions adapted for preserving information across layers of the neural network, according to an embodiment.

FIG. 3 is a schematic representation of a neural network 312, according to an embodiment. The neural network 312 can be a part of a maliciousness classification device such as the device 100 described with respect to FIG. 1. The neural network 312 can be the same as or substantially similar to the neural network 212 described with respect to FIG. 2 and/or the neural network 112 described with respect to FIG. 1. For example, the neural network 312 can include an input layer 340, one or more hidden layers 350, 360, and an output layer 370. Each hidden layer 350, 360, as described previously, can include a normalization layer (e.g., layer 351 and 361) and an activation layer (e.g., 352, 362). The input layer 340, the hidden layers 350, 360, and the output layer 370 are connected by interlayer connections 342, 343, and 344 respectively. The normalization layer 351, 361 and the activation layer 352, 362 of each hidden layer 350, 360 are connected by connections 345 and 346.

As described above in association with neural network 212 represented by the block diagram in FIG. 2, the input layer 340 of the model 312 can include one or more input nodes 341 configured to receive a set of values associated with a file in the form of an input vector associated with a set of features extracted from the file (e.g., file 123 of FIG. 1). The hidden layers 350 and 360, each include a normalization layer (351, 361) and an activation layer (352 and 362). Similar to hidden layers 250 and 260, the hidden layer 350 can be the first hidden layer and hidden layer 360 can be the last hidden layer where "n" is the number of hidden layers. Any additional intermediary hidden layers are depicted by the dashed line of connection 343.

The normalization layers 351 and 361 (and in some instances others not shown) each include normalization nodes 353 and 363, respectively, configured to normalize the set of values in the input vector received from the previous layer (the input layer 341 or the previous activation layer such as 352, as the case may be) using one or more parameters (e.g., mean and standard deviation) computed from the set of values in the input vector. For example, in some implementations the input vector can be normalized by subtracting, from each value from the set of values in the input vector, the mean of the set of values in the input vector, and dividing, each of the mean-subtracted set of values of the input vector, by the standard deviation of the set of values of the input vector. The normalization layers 351, 361 also include one or mode parameter nodes such as parameter nodes 354 and 364 of normalization layers 351 and 361, respectively. The parameter nodes 354 and 364 can be configured to provide the parameters used during normalization by the normalization layer 351, 361 to the corresponding activation layers 352, 362, as additional inputs, thereby preserving information about the set of features in the input vector, which may otherwise be lost in the process of normalization. This allows the activation layers 352 and 362 to take the information regarding normalization into consideration when performing calculations. Thus, where scale is important to the classification of the data and/or file, the scale can be used by the activation layers 352 and 362 and is not lost through normalization.

As described previously, normalization can be carried out using any suitable approach and the associated parameters can be provided as inputs via the parameters nodes. For example decimal scaling normalization can be used where the inputs are decimally scaled by a scale factor based on the largest values from the set of values in the input vector, and the scale factor can be provided as a parameter. In some implementations, Max-Min normalization can be used where the values from the set of values in the input vector are scaled between the maximum and minimum values in the input vector. For example, the minimum value can be subtracted from each individual value from the set of values in the input vector and the subtracted value can be divided by the difference between the maximum and the minimum values in the input vector. In such implementations, for example, the maximum and minimum values can be provided as inputs to an activation layer via the parameter nodes of a preceding normalization layer.

The activation layers 352 and 362 (and in some instances others not shown) each include activation nodes 355 and 365, respectively. As described above with reference to FIG. 2, each activation node can be associated with an activation function that is applied to the weighted inputs received by that node from the preceding layer through the associated connections. For example, each activation node 355 in the activation layer 352 can be associated with a suitable activation function that is applied on the inputs received by that node from the normalization nodes 353 and the parameters nodes 354 of the preceding normalization layer 351 through the weighted connections 345. In some implementations, the number of activation nodes 355, 365 in one or more activation layers 352, 362 can correspond to the number of normalization nodes 353, 363 (excluding the parameter nodes 354, 364) of the preceding normalization layer 351, 361, as shown in activation layers 352 and 362. In such instances, each activation layer 352, 362 can have a number of inputs less than the number of outputs of the preceding normalization layer 351, 361. In other implementations, one or more activation layers can include a number of activation nodes that is the same as the number of normalization nodes plus the parameter nodes of the preceding normalization layer. In such instances, each activation layer can have a number of inputs equal to the number of outputs of the preceding normalization layer.

As described above with reference to activation layers 252 and 262 in neural network 212 in FIG. 2, the activation nodes 355, 365 can be configured to, when implemented, transform the set of values in the input vector from the preceding normalization layer by applying activation functions associated with each activation node 355, 365. The activation nodes 355, 365 in the activation layers 352, 362 can be configured to calculate, based on the normalized set of features and the parameters used by the preceding normalization layers 351, 361, respectively, a set of results that can be used to classify the file based on maliciousness (e.g., produce a maliciousness classification for the file). For example, the activation nodes 355, 365 can be Rectified Linear Units (ReLUs) implementing linear rectifier activation functions. In some implementations, one or more activation nodes 355, 365 in one or more activation layers 352, 362 can be configured to implement any suitable activation function such as, for example, sigmoid or logistic functions, hyperbolic tangent functions, softmax functions, and/or the like. In some implementations, one or more activation layers 352, 362 can also include activations nodes 355, 365 that can be leaky units (e.g. leaky ReLUs) or implement Maxout activation functions, or the like, to handle suitable data and training or testing conditions.

In use, a set of features such as for example, headers, variable definitions, routines, sub-routines, strings, elements, subtrees, tags and/or the like can be extracted from a file by a feature extractor and used to define a feature vector. The feature vector can be a set of values in the input vector of a predetermined size that can be provided to a neural network 312. For example, the feature extractor can normalize each feature and/or input each feature to a hash function to produce a hash value. The feature extractor, using the hash values, can form a feature vector (e.g., of predetermined length and/or of variable length). For example, in some implementations, the feature extractor can be configured to extract and/or identify features of a word processing file (e.g., a '.doc' file). The feature extractor can use the hash values to form a feature vector representative of and/or indicative of the features in the word processing file. In some instances, the hashing can be performed to reduce the feature space into a set of blocks having a predetermined size (for example, a block size of 512, a block size of 1024, a block size of 2048 and/or the like).

The feature vector can be provided to the input layer 340 of the neural network 312. The number of input nodes 341 in the input layer 340 can correspond to the block size of the feature vector (e.g., 512 input nodes to receive an input vectors of block size 512).

The inputs from each of the input nodes 341 can be provided to the normalization layer 351 of the first hidden layer 350. The normalization layer 351 can compute one or more parameters that can be used to normalize the inputs received from the input layer 341.

The use of parameter nodes such as 354, 364 in the implementation of the neural network 312 can prevent loss of information incurred by the process of normalization. Normalization of the set of values in the input vector has the effect of centering and rescaling the values in the input vector before activation so that the inputs can be close to zero, reducing the effect of saturation in some activation functions and mean drift in others. Normalization, however, also removes scale-related information from the set of values in the input vector. For instance, two example input vectors can be [10, 1, 0] and [1000, 100, 0] respectively. In this example, normalization can be performed by subtracting the mean of the vector from each input in the vector, and dividing each input by the standard deviation of the vector. Each of these input vectors, after normalization, can have identical values [1.4083737, −0.59299945, −0.81537425] (which can then be rescaled and shifted by learned bias and scaling factors). Particularly for count-related data, where the magnitude of the vector correlates with the total size of the input example, this can remove a meaningful signal from the data. This loss can be prevented by preserving the parameters using the parameter nodes 354 and 364, as described herein.

The use of parameter nodes 354 and 364 (and the like) can solve the above described deficiency of normalization while also retaining the benefits of normalization by slightly expanding the representation of the normalization layer to include two additional parameters representing the mean and standard deviation (or variance) that were removed. For example, the two parameter nodes 354 can carry the mean and the standard deviation of the values based on which normalization was performed. In the above stated example, the two vectors output from the normalization layer 351, 361 will, under the implementation of the neural network 312, have expanded pre-activation representations of
[1.4083737, −0.59299945, −0.81537425, 3.66666, 4.496]
and
[1.4083737, −0.59299945, −0.81537425, 36.666, 44.969]
where the fourth and fifth components are the mean and standard deviation, respectively, of the two rescaled vectors. The first three components of the input vector can be provided to the activation layers 352 and 362 through the normalization nodes 353 or 363, respectively, and the last two components can be provided to the activation layers 352 and 362 through the parameter nodes 354 or 364, respectively, thus retaining information pertaining to the different absolute values and ranges. This allows the nodes 355 and 365 of the activation layers 352 and 362 to use the values provided by the parameter nodes 354 and 364, respectively, when performing classification. Thus, the scale of the input values can be considered during classification.

As described previously, any number of suitable parameters that may be informative about the scaling of the pre-normalization input vector can be used and provided to activation layers using a corresponding number of parameter nodes of that particular normalization layer. The number of activation nodes in the subsequent activation layer can correspond to only the number of normalization nodes (excluding the parameter nodes) so that there is no cumulative increase in the number of nodes or a cumulative increase in the size of subsequent input vectors for the following layers of the neural network. For example, as described above with reference to the network 312 in FIG. 2, the number of activation nodes 355 in activation layer 352 can correspond to the number of normalization nodes 353 of the normalization layer 351 excluding the parameters nodes 354 of the normalization layer 351, as shown in FIG. 3. Similarly stated, the parameter nodes do not increase the number of activation nodes. In other implementations, the number of activation nodes can be equal to the sum of the normalization nodes and the parameter nodes of the preceding normalization layer. In other words, the activation layer can have two more activation nodes (not shown in FIG. 3), resulting in an increment in the size of input vector to the next hidden layer. In some implementations, one or more activation layers can have incrementing number of activation nodes that correspond to the number of parameter nodes of the preceding normalization layer, resulting in a cumulative increase in the input vector at each stage of normalization and activation within the neural network.

As described above, the neural network 312 can be trained with a set of files having a maliciousness classification known to the neural network and then tested with a set of files having a maliciousness classification unknown to the neural network. In some instances, the neural network 312 can be configured to compute and use several parameters in a training or testing phase and the maliciousness classification device (e.g., device 100 of FIG. 1) can include suitable additional components such as a neural network performance evaluator (not shown) that can evaluate the performance of the model based on suitable criteria such as detection efficiency, classification accuracy, etc. The device can also include components such as a neural network modifier that, based on the information received from the evaluator, can probe the network structure of topography (e.g., probe the weights of specific connections associated with specific normalization or activation layers) and modify the weights or set one or more predetermined conditions, limits, etc. For example, the network modifier may, based on the results from an evaluator, probe weights associated with parameter nodes and decide which parameters may be useful and remove extraneous parameters from subsequent training and/or testing.

The previously described examples describe using parameter nodes in normalization layers to preserve scaling information by providing parameters used with a process of layer normalization. In layer normalization the inputs from a single feature vector derived from a file or data set are processed by the input nodes of an input layer and the resulting weighted input vector is provided to the normalization layer. Normalization is performed on and is based on the inputs from the values of that particular data set. Thus, the parameters used for normalization are calculated based on that particular data set. Similarly, for subsequent hidden layers, outputs of the activation nodes are provided as inputs to the normalization nodes of the following normalization layer and normalization is performed on the inputs. The parameters used for the normalization are calculated based on the inputs.

In other implementations, batch normalization can be performed by a normalization layer of a neural network layer to provide normalized inputs to an activation layer. In batch normalization, normalization is performed in a different dimension of the input data. In batch normalization, normalization can be based on values over multiple data sets and/or feature vectors that are associated with a particular node in a normalization layer. Similarly stated, normalization is performed on a node-by-node basis, rather than a layer-by-layer basis. Accordingly, each node in a normalization layer can normalize an input value that is provided to that node based on other values that have been provided to that node. Accordingly, the parameters (e.g., mean, standard deviation, etc.) used to normalize values provided to that node can be calculated based on other values from other data sets and normalized by that node. Similarly for subsequent hidden layers, outputs of a preceding activation layer can act as inputs to nodes in a following normalization layer, such that normalization at each node can be performed and based on other values from other data sets and normalized by that node.

In some implementations, the inputs provided to a specific normalization node and used to normalize the data at that node using batch normalization can be called a mini-batch. Specifically, the parameters used to normalize data at that node can be calculated from a mini-batch (e.g., a set of data inputs to that node). The values from different mini-batches can be used to normalize different data for that node based on type, time period in which the data is received, and/or the like. As an example, a mini-batch based on time can be used to normalize the data based on values received at the node during a specific time period (e.g., within the past day) prior to receiving the data to be normalized. As another example, a node can normalize the data based on a specific number of values (e.g., 10, 100, 200, 1000, etc.) received at the node prior to the data to be normalized. As such, rolling values can be used to normalize the values at a specific node.

During implementation of batch normalization, the parameters used to normalize can be provided as additional inputs to the following activation layer via one or more parameter nodes, as described above with respect to using parameters nodes 254,264 in the network 212, or parameter nodes 354,364 in the network 312. When used with batch normalization, however, each normalization node can be associated with one or more parameter nodes to provide the parameters associated with normalization of inputs. Similarly stated, because normalization is performed on a node-by-node basis, rather than a layer-by-layer basis, each node in a normalization layer can have one or more parameters associated with normalization at that node.

As an example, batch normalization of inputs provided to a specific normalization node can be performed through mean subtraction, where the mean of a mini-batch is subtracted from the input values, and dividing the mean subtracted value by the standard deviation of the mini-batch. In such implementations, one or more parameters used during normalization, such as the mean and the standard deviation, can be computed by the one or more parameter nodes associated with each normalization node and can be provided as inputs to the activation nodes in the following activation layer such that scaling information about the non-normalized inputs is preserved. Thus, the number of nodes in the normalization layer can be increased by a factor of the number of parameters to be preserved and provided as inputs to the following activation layer. As described above, normalization can be carried out using any suitable procedure, such as min-max normalization or decimal scaling, and/or the like.

In some implementations of a neural network, dropout methods can be included to improve performance of the neural network. For example, dropout strategies can be included in one or more hidden layers by dropping or disregarding specific predetermined normalization nodes (dropout nodes) by using a dropout mask to prevent over fitting of data and/or to increase robustness of classification. In such implementations, one or more parameter nodes can be associated with each normalization layer to preserve information about the dropout mask containing the identities of the dropout nodes as a parameter. The parameter nodes in these implementations can provide, as inputs to the following activation layer, the information about the dropout mask.

Figure 4:
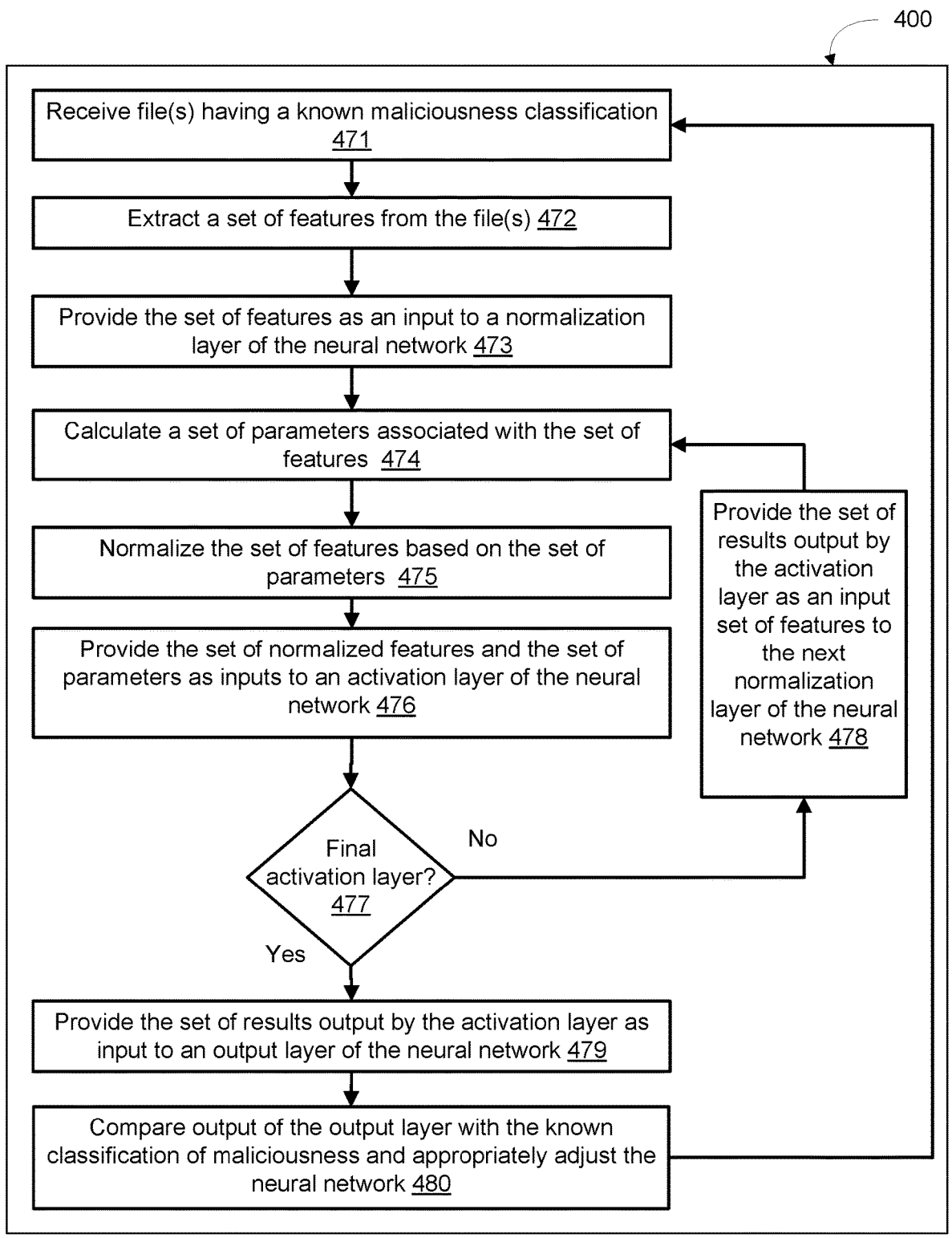
FIG. 4 is a flowchart illustrating a method for training a neural network to classify one or more files based on maliciousness while preserving information across layers of the neural network, according to an embodiment.

FIG. 4 is a flowchart illustrating a method 400 for training a neural network (e.g., similar to the networks 212 and 312 shown and described with respect to FIGS. 2 and 3, respectively), according to an embodiment. At 471, a processor (e.g., similar to the processor 110 shown and described with respect to FIG. 1) receives file(s) having a maliciousness classification known to a neural network.

At 472, a feature extractor (e.g., similar to the feature extractor 111 shown and described with respect to FIG. 1) extracts a set of features from the file(s). In some instances, the feature extractor and/or the processor can transform the set of features into a feature vector. For example, the feature extractor can input each feature to a hash function to produce a hash value and using the hash values, form a feature vector of a pre-determined length.

At 473, the processor provides the set of features as an input to a normalization layer of the neural network. As described herein, in some instances, the set of features transformed into a set of values in an input vector can be provided as an input to a normalization layer. The set of features can be provided as input to the normalization layer via a set of normalization nodes and a set of parameter nodes.

At 474, the processor calculates a set of parameters associated with the set of features. In some instances, the normalization nodes and the parameter nodes of the normalization layer can calculate the set of parameters associated with the set of features. At 475, the normalization layer can normalize the set of features based on the set of parameters. In some instances, each normalization node can calculate the set of parameters and normalize a different feature from the set of features based on the calculated set of parameters.

At 476, the set of normalized features and the set of parameters can be provided as inputs to an activation layer of the neural network. For example, the normalized set of features can be provided as an input to the activation layer via the normalization nodes of the normalization layer, and the set of parameters can be provided as an input to the activation layer via the parameters nodes of the normalization layer. The activation layer, can calculate, based on the normalized set of features and the set of parameters used to normalize the set of features, a set of results that can be used to classify the file based on maliciousness.

At 477, if the current activation layer is not the final activation layer in the neural network, at 478 the set of results output by the activation layer is provided as an input set of features to the next normalization layer. As described above, steps 474-477 can be carried out iteratively on each normalization layer and each activation layer of the neural network until the final activation layer is reached. For example, following providing a set of features as input to a normalization layer, a set of parameters associated with the set of features as input to the normalization layer can be calculated at 474, based on which the set of features can be normalized at 475. In some implementations, the normalized set of features can be equal to the number of results in the set of results obtained from a preceding activation layer. The normalized set of features and the set of parameters can be provided as inputs to a subsequent activation layer, at 476, to obtain a set of values output by the activation layer, until the current activation layer is the final activation layer in the neural network.

If, at 477, the current activation layer is the final activation layer, at 479, the set of results output by the activation layer is provided as an input to an output layer of the neural network.

At 480, the processor can compare the output of the output layer of the neural network with the known classification of maliciousness of the file and appropriately adjust the neural network. Specifically, the processor can train the neural network by appropriately adjusting weights based on the comparison. Several iterations of the method 400 can be carried out with different set of features extracted from a different files with a maliciousness classification known to the neural network such that results of comparison of output of the neural network and the known classification can be used to train the neural network. Training can be conducted using any suitable approach such as, for example, using a suitable back propagation method.

Figure 5:
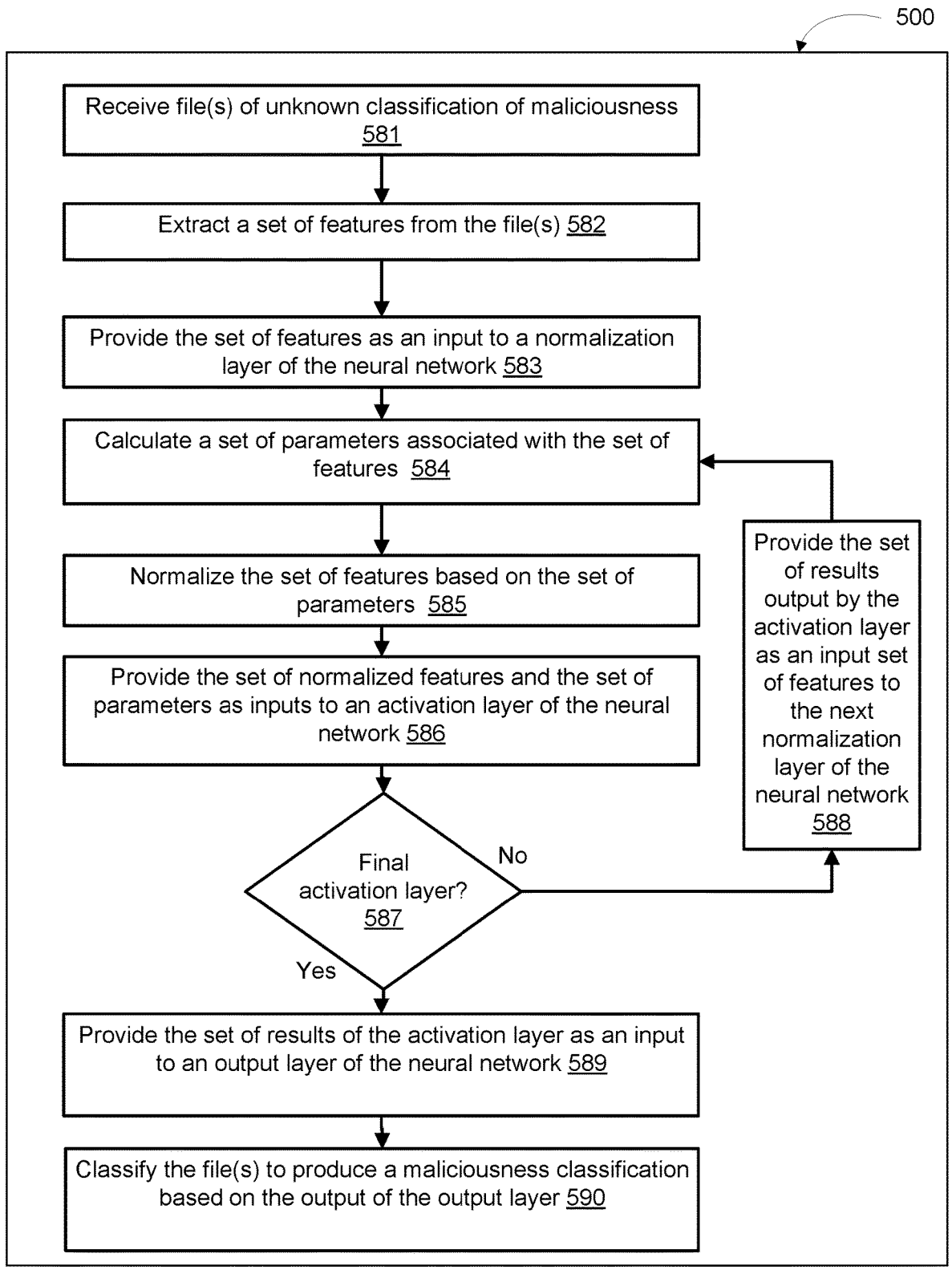
FIG. 5 is a flowchart illustrating a method for using a neural network to classify one or more files based on maliciousness while preserving information across layers of the neural network, according to an embodiment.

FIG. 5 is a flowchart illustrating a method 500 for using a trained neural network (e.g., similar to the networks 212 and 312 shown and described with respect to FIGS. 2 and 3) within a maliciousness classification device, to classify an unknown file or data set, according to an embodiment. At 581, a processor (e.g., similar to the processor 110 shown and described with respect to FIG. 1) receives a file(s) with a classification of maliciousness that is unknown to the neural network.

At 582, a feature extractor (e.g., similar to the feature extractor 111 shown and described with respect to FIG. 1) extracts a set of features from the file. In some instances, the feature extractor and/or the processor can transform the set of features into a feature vector. For example, the feature extractor can input each feature to a hash function to produce a hash value and using the hash values, form a feature vector of a pre-determined length.

At 583, the processor provides the set of features as an input to a normalization layer of the neural network. As described herein, in some instances, the set of features transformed into a set of values in the input vector can be provided as an input to a normalization layer. The set of features can be provided as input to the normalization layer via a set of normalization nodes and a set of parameter nodes.

At 584, the processor calculates a set of parameters associated with the set of features. In some instances, the normalization nodes and the parameter nodes of the normalization layer can calculate the set of parameters associated with the set of features. At 585, the normalization layer can normalize the set of features based on the set of parameters. In some instances, each normalization node can calculate the set of parameters and normalize a different feature from the set of features based on the calculated set of parameters.

At 586, the set of normalized features and the set of parameters can be provided as inputs to an activation layer of the neural network. For example, the normalized set of features can be provided as an input to the activation layer via the normalization nodes of the normalization layer, and the set of parameters can be provided as an input to the activation layer via the parameters nodes of the normalization layer. The activation layer, can calculate, based on the normalized set of features and the set of parameters used to normalize the set of features, a set of results that can be used to classify the file based on maliciousness.

At 587, if the current activation layer is not the final activation layer in the neural network model, at 588 the set of results output by the activation layer is provided as an input to the next normalization layer. As described above, steps 584-587 can be carried out iteratively until the final activation layer is reached. For example, following providing a set of features as input to a normalization layer, a set of parameters associated with the set of features as input to the normalization layer can be calculated at 584, based on which the set of features can be normalized at 585. In some implementations, the normalized set of features can be equal to the number of results in the set of results obtained from a preceding activation layer. The normalized set of features and the set of parameters can be provided as inputs to a subsequent activation layer, at 586, to obtain a set of results output by the activation layer, until the current activation layer is the final activation layer in the neural network.

If, at 587, the current activation layer is the final activation layer, at 589, the set of results output by the activation layer is provided as an input to an output layer of the neural network.

At 590 a maliciousness classifier (e.g., the malicious classifier 113 shown in FIG. 1) can receive the output of the output layer of the neural network and classify the files(s) to produce a maliciousness classification. For example, the maliciousness classifier can, based on the output of the output layer of the neural network, categorize the file. The steps 582 to 590 can be performed iteratively for several sets of files and/or data.

While the examples provided above describe classification of maliciousness of a file, the disclosed devices and methods can be used for any kind of classification of any data such as image data, video data, voice data or text based data, numbers and counts based data and/or the like. For example, rather than and/or in addition to producing a maliciousness classification, the devices and methods disclosed herein can be used to classify images based on analysis of their content using one or more image characteristics that are captured. For example, the image characteristics can be color, gradient, smoothness, objects, object contours, etc. Based on analysis of the content using extracted characteristics the images can be classified as, for example, images of humans, animals, objects such as vehicles, weather patterns from radar outputs, etc. In other instances, the devices and methods described herein can be used to classify audio content, video content, text content, file type, and/or any other suitable events, objects, artifacts and/or data for any other suitable purpose, in addition to and/or instead of producing a maliciousness classification.

As an example, the maliciousness classification device 100 (shown and described with respect to FIG. 1) can be used to classify graphical content, such as, images, videos, graphs and/or the like. For example, the neural network 112 can classify images specific to and/or including animals (e.g., a dog, a cat and/or other types of animals), birds (e.g., a sparrow, a crow and/or other types of birds), vehicles, humans and/or the like. In other implementations, the maliciousness classification device 100 can be configured to classify any other type of data, files, images, and/or the like in any suitable manner.

The devices and methods described above can, in some implementations, be used to classify files using additional or supplemental information about the file in addition to the output of a neural network. For example, information about source of the file, an author associated with the file, the type of file, a history of the file, a length of the file, a date associated with the file, an extension associated with the file and/or the like can be used in combination with the output of a neural network to classify the file.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

In this disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," "including," or the like) provided herein, is intended merely to better illuminate the embodiments and does not pose a limitation on the scope of the embodiments or the claims.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:
a memory; and
a processor operatively coupled to the memory, the processor configured to extract a set of features from a potentially malicious file, the processor configured to provide the set of features as an input to a normalization layer of a neural network used to classify the potentially malicious file, the normalization layer including one or more normalization nodes and one or more parameter nodes different than the one or more normalization nodes, the one or more parameter nodes configured to provide a set of parameters used during normalization as an additional input,
the processor configured to implement the normalization layer by calculating the set of parameters associated with the set of features and providing the set of parameters as an output from the normalization layer via the one or more parameter nodes, the processor configured to normalize the set of features based on the set of parameters to define a set of normalized features,
the processor configured to provide the set of normalized features, via the one or more normalization nodes, and the set of parameters, via the one or more parameter nodes, as inputs to an activation layer of the neural network such that the activation layer produces an output (1) based on the set of normalized features and the set of parameters and (2) used to produce a maliciousness classification of the potentially malicious file.

2. The apparatus of claim 1, wherein the set of parameters includes a mean of the set of features and a standard deviation of the set of features.

3. The apparatus of claim 1, wherein the maliciousness classification of the potentially malicious file indicates whether the potentially malicious file is malicious or benign.

4. The apparatus of claim 1, wherein the maliciousness classification of the potentially malicious file classifies the potentially malicious file as a type of malware.

5. The apparatus of claim 1, wherein the set of parameters includes a mean of the set of features and a standard deviation of the set of features,
the processor is configured to normalize each feature from the set of features by subtracting the mean from that feature and dividing by the standard deviation.

6. A non-transitory processor-readable medium storing code representing instructions to be executed by a processor, the code comprising code to cause the processor to:
receive, at a normalization layer of a neural network used to classify a file, a set of values associated with the file;
calculate, at the normalization layer, a numerical mean of the set of values;
calculate, at the normalization layer, a numerical standard deviation of the set of values;
normalize, at the normalization layer, the set of values using the numerical mean and the numerical standard deviation to define a set of normalized values;
provide to an activation layer of the neural network the set of normalized values, and provide to the activation layer the numerical mean and the numerical standard deviation used during the normalization, the numerical mean and the numerical standard deviation each being provided as an additional input; and
calculate, at the activation layer and based on the set of normalized values, the numerical mean, and the numerical standard deviation, a set of results used to classify the file.

7. The non-transitory processor-readable medium of claim 6, wherein the normalization layer is a first normalization layer that includes a first set of normalization nodes and a first set of parameter nodes, and the activation layer is a first activation layer, the set of normalized values being provided to the first activation layer via the first set of normalization nodes, the code further comprising code to cause the processor to:
provide, to a second normalization layer of the neural network, the set of results, the second normalization layer including a second set of normalization nodes and a second set of parameter nodes different than the second set of normalization nodes;
calculate, at the second normalization layer, a numerical mean of the set of results;
calculate, at the second normalization layer, a numerical standard deviation of the set of results;
normalize, at the second normalization layer, the set of results based on the numerical mean of the set of results and the numerical standard deviation of the set of results to define a set of normalized results; and
provide to a second activation layer of the neural network the set of normalized results via the second set of normalization nodes, and the numerical mean of the set of results and the numerical standard deviation of the set of results via the second set of parameter nodes.

8. The non-transitory processor-readable medium of claim 6, wherein the set of normalized values includes a number of values equal to a number of results in the set of results.

9. The non-transitory processor-readable medium of claim 6, the code further comprising code to cause the processor to:
extract the set of values from the file, the set of results being used to produce a maliciousness classification of the file.

10. The non-transitory processor-readable medium of claim 6, wherein the code to cause the processor to normalize includes code to cause the processor to, for each value from the set of values, subtract the numerical mean from that value and divide by the numerical standard deviation.

11. The non-transitory processor-readable medium of claim 6, wherein the set of results is used to classify the file by producing a maliciousness classification of the file.

12. A method, comprising:
receiving a set of values at a normalization layer of a neural network implemented in a processor of a compute device, the normalization layer including a set of normalization nodes and a set of parameter nodes different than the set of normalization nodes, the set of parameter nodes configured to provide a set of parameters used during normalization, to an activation layer, as an additional input;
calculating, at the processor, the set of parameters associated with the set of values;
normalizing, at the processor, the set of values based on the set of parameters to define a set of normalized values; and providing the set of normalized values to the activation layer of the neural network via the set of normalization nodes, each normalization node from the set of normalization nodes configured to provide a normalized value from a set of normalized values, and providing the set of parameters to the activation layer of the neural network via the set of parameter nodes, each parameter node configured to provide a parameter from the set of parameters such that the activation layer identifies a set of results based on the set of normalized values and the set of parameters.

13. The method of claim 12, wherein the set of parameters includes a numerical mean of the set of values and a numerical standard deviation of the set of values.

14. The method of claim 12, wherein each value from the set of values represents a feature from a set of features extracted from a file.

15. The method of claim 12, further comprising:
extracting the set of values from a potentially malicious file, the set of results being used to produce a maliciousness classification of the potentially malicious file.

16. The method of claim 12, wherein the set of normalized values includes a number of values equal to a number of results in the set of results.

17. The method of claim 12, wherein a number of inputs to the activation layer is equal to a number of normalized values in the set of normalized values plus a number of parameters in the set of parameters,
a number of outputs from the activation layer is equal to the number of normalized values in the set of normalized values.

18. The method of claim 12, wherein the normalization layer is a first normalization layer, the set of normalization nodes is a first set of normalization nodes, the set of parameter nodes is a first set of parameter nodes, the activation layer is a first activation layer, and the set of parameters is a first set of parameters, the method further comprising:
providing, to a second normalization layer of the neural network, the set of results, the second normalization layer including a second set of normalization nodes and a second set of parameter nodes, each node in the second set of parameter nodes configured to provide a parameter from a second set of parameters used during normalization at the second normalization layer as an additional input;
calculating, at the second normalization layer, the second set of parameters associated with the set of results;
normalizing, at the second normalization layer, the set of results based on the second set of parameters to define a set of normalized results; and
providing to a second activation layer of the neural network the set of normalized results via the second set of normalization nodes and the second set of parameters via the second set of parameter nodes.

19. The method of claim 12, wherein the set of parameters includes a numerical mean of the set of values and a numerical standard deviation of the set of values,
the normalizing including normalizing each value from the set of values by subtracting the numerical mean from that value and dividing by the numerical standard deviation.

20. The method of claim 12, wherein each value from the set of values is received sequentially at a node within the normalization layer, each normalized value from the set of normalized values is provided sequentially to the activation layer.

* * * * *